May 28, 1957     C. HIRSCHKORN     2,793,542
EXTENSION HANDLE FOR REELS
Filed April 27, 1953
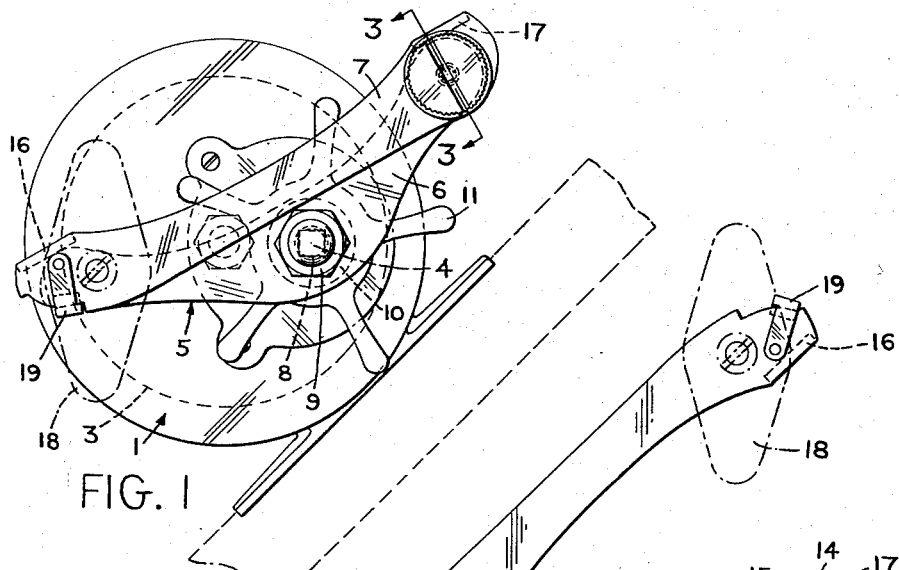
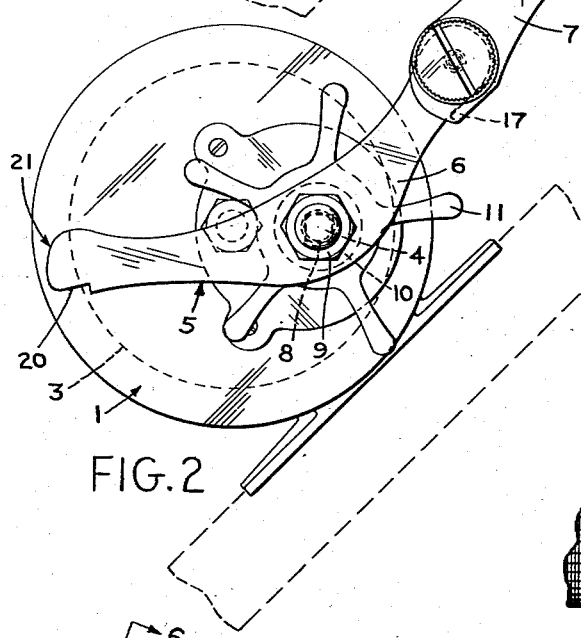
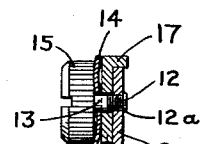
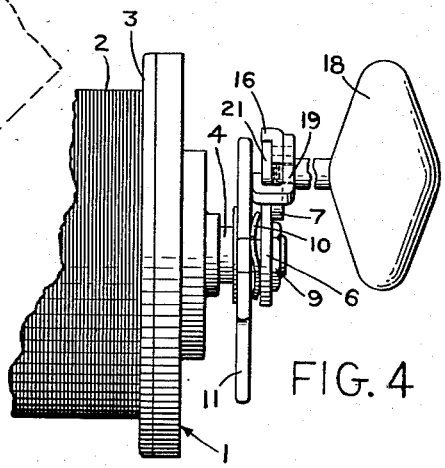
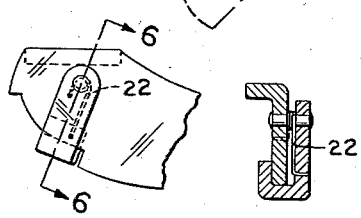
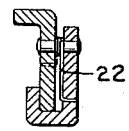
CYRUS HIRSCHKORN
*INVENTOR.*

United States Patent Office 2,793,542
Patented May 28, 1957

2,793,542

EXTENSION HANDLE FOR REELS

Cyrus Hirschkorn, New York, N. Y.

Application April 27, 1953, Serial No. 351,090

12 Claims. (Cl. 74—546)

This invention relates generally to reels and more particularly to an extensible, unfolding type handle for a reel mounted on a fishing rod or the like device in which a constant tension must be maintained on the line or cable mounted about, fed off and rewound on suitable mechanism on the reel.

The preferred form of this invention is shown as applied to the sport of fishing although it will be understood that it is clearly applicable to any device in which reeling mechanism of a like nature is utilized.

In connection with the application of this invention to the sport of fishing, it has been found by fishermen using a conventional reel and handle that when a large "sporty" game fish is hooked there is insufficient leverage which causes the fisherman to tire rapidly and develop "cramping" of the arms and shoulder muscles.

If larger handles are placed on the reels initially it, of course, renders them relatively poor from a sporting standpoint when lighter fish are hooked, as the fisherman then tends to "horse" the fish in losing the thrill and enjoyment of the sport.

The present invention overcomes this problem by means of a two-position handle, adapted to fit any standard type reel, which in the closed or locked position is substantially equivalent to the conventional handle for such reels but in the open or unlocked position unfolds or extends to give the additional leverage required to overcome the short scope of the conventional handle.

To provide means for adapting the handle of the present invention to be moved into its extended position an easily operable manually-operated locking means is provided thereon.

Accordingly, it is an object of the present invention to provide an extensible unfolding type reel handle to be affixed to any conventional reel for increased reeling leverage.

It is another object of the present invention to provide an extensible unfolding type reel handle for a reel which can be locked in its closed position to act as a conventional type handle but manually opened during the fishing operation to the unlocked position if the increased leverage is desired.

With this and other objects in view, as may appear from the accompanying specification, the invention consists of various features of construction and combination of parts, which will be first described in connection with the accompanying drawings, showing an extension handle for reels of a preferred form embodying the invention, and the features forming the invention will be specifically pointed out in the claims.

In the drawings:

Figure 1 is a side view of the invention showing it in the closed position on a reel.

Figure 2 is a side view of the invention showing it in the open position on a reel.

Figure 3 is a section taken on line 3—3 of Figure 1 showing the pivotal elements.

Figure 4 is an end view of the handle mounted on a reel, and showing the locking catch element.

Figure 5 shows an automatic locking catch element.

Figure 6 is a section taken on line 6—6 in Figure 5.

Referring to the drawings, Figures 1 and 4 show a fishing reel 1 which may be any type of the many standard reels easily purchasable on the open market having the usual fishing line 2 mounted on a rotatable spool 3 connected by suitable gearing (not shown) to a winding shaft 4. The winding shaft 4 acts to rotate the spool 3 and thus winds and unwinds the fishing line 2.

The winding shaft 4 will be rotated by an extensible handle generally designated 5, which includes a connecting member 6 and an extension arm 7, which may be composed of any suitable material of sufficient strength and adapted to resist corrosion.

The connecting member 6 is a substantially flat element, arcuate in shape, with a suitable opening 8 therethrough to enable it to be fixedly connected to and rotatable with the winding shaft 4 of the reel 1 by a nut member 9 adapted to fit over the threaded end of the winding shaft, all of which is clearly shown in Figures 1, 2 and 4 of the drawings.

A spring member 10 is inserted between the inner face of the connecting member 6 and the outer face of the star brake 11 to allow for movement thereof and to prevent excessive lateral movement of the handle member 5 on the winding shaft.

The opening 8 on the connecting member 6 may, of course, be varied with the size and type of the standard reels to which it will be adapted without departing from the spirit of the present invention.

Figure 3 shows that one end of the connecting arm 6 will be provided with a threaded bore 12 to threadably receive a pivot member 13 which pivotally mounts one end of the extension arm 7 in side-by-side relation with this end of the connecting member 6. The pivot member 13 is peaned over the inner face of the connecting member as at 12a to prevent the loss thereof and is spring-tensioned by means of an S-shaped resilient member 14 which lies between the outer face of the extension arm 7 and the enlarged knurled head 15 of the pivot member 13.

The extension arm 7 is a substantially elongated flat rectilinear member slightly larger than the connecting member 6 which by reason of the pivotal connection to the connecting member 6 may be folded or jack-knifed onto the connecting member 6 to a locked position as is shown in Figure 1 or as shown in Figure 2 may be extended relative thereto to the unlocked position. The limit of the movement to or from the locked to the unlocked position will be controlled by laterally projected stop members 16 and 17 disposed at either end of the extension arm 7 which engage inwardly of either end of the connecting member 6 on the upper side thereof, in the locked position and on the lower side thereof in the unlocked positions, all of which is clearly shown in Figures 1, 2 and 4 of the drawings.

Remote from the pivotal end the extension arm 7 has a manual gripping knob or member 18 rotatably connected thereto which gripping knob is grasped by the operator to pivot the extension arm to and from the locked and unlocked positions.

The means for holding the extension arm 7 in the locked positions after it is folded thereto and limited by the stop 16, is shown in Figure 4 as a depending L-shaped latch 19 which is pivotally mounted by its longer arm to the gripping knob end of the extension arm with the shorter leg thereof facing inwardly so that this short leg may be manually pivoted into and out of engagement with a locking recess 20. The L-shaped latch is substantially rounded on its outer surface, and the end of the connecting arm 6 remote from the pivotal end thereof will also be rounded and an arcuate camming surface 21 established to act for the automatic movement of the L-shaped latch to a non-engaged position when the extension arm 7 is folded onto the connecting arm during the movement to the locked position. The L-shaped latch 19 must then be moved manually into locking engagement with the locking recess 20.

Figures 5 and 6 show an automatic means for returning the L-shaped latch 19 into latching position. Thus the L-shaped latch 19 has mounted about its pivot member a resilient spring element 22 having one leg fixedly connected to the extension arm and the other leg fixedly connected to the L-shaped latch 19. This spring will tend to urge the L-shaped latch inwardly and in order to release this extension arm it will be necessary to move the L-shaped latch 19 manually until the extension arm 7 is moved to the extended or open position.

*Operation*

In operation, the reel is normally used with the extension arm 7 folded on the connecting arm 6 in the locked position as shown in Figure 1. In this position the operator can grasp the gripping knob or member 18 and uses the handle and reel as any other conventional reel and handle is used.

However, when extra leverage is needed the L-shaped latch is manually opened by a flick of the operator's thumb to release the extension arm 7 and the extension arm may then be pivoted to the unlocked or open position until the lateral stop member 17 limits further movement, without interfering with the normal winding movement in operation.

The spring-tensioned pivot means prevents undue lateral movement between the connecting member and the extension arm in either position.

When it is desired to return the extension arm 7 to the locked position, it is folded or jack-knifed back on the connecting member 6. The L-shaped latch will be cammed out of engagement by the arcuate camming surface 21 and the operator therefor has to pivot it back into locking engagement with the locking recess 20 to hold the extension arm in the locked position.

It will be understood that the invention is not to be limited to the specific construction or arrangement of parts shown, but that they may be widely modified within the invention defined by the claims.

What is claimed is:

1. The combination with a reel having a winding shaft extending out of one side thereof of a handle for said reel including, a connecting member fixedly connected to and rotatable with said winding shaft, an extension arm having a gripping member at one end, and resilient pivotal means pivotally connecting the other end of said extension arm to one end of said connecting member, said extension arm normally jack-knifed in locking engagement with said connecting member and adapted to be extended from a locked to an unlocked position, and manually openable locking means connected to the end of said extension arm remote from the pivoted end to engage said connecting member for holding said extension arm in the locked position.

2. The combination with a reel having a winding shaft extending out of one side thereof of a handle for said reel including a connecting member fixedly connected to and rotatable with said winding shaft, an extension arm having a manual gripping member at one end, resilient pivotal means connecting the other end of said extension arm to one end of said connecting member, locking means formed on said extension arm for holding said extension arm in a locked position, said locking means including a manually openable latch at the gripping end of said extension arm to engage and disengage said connecting member remote from the pivotal means to allow said extension arm to be extended from the locked to the unlocked position.

3. The combination with a reel having a winding shaft extending out of one side thereof of a handle for said reel including a connecting member fixedly connected to and rotatable with said winding shaft, an extension arm having a manual gripping member at one end, spring tensioned pivotal means connecting the other end of said extension arm to one end of said connecting member, locking means formed on said extension arm for holding said extension arm in a locked position, said locking means including, at least one lateral stop member formed adjacent the gripping end of said extension arm, and a manually openable latch at the gripping end of said extension arm to engage and disengage said connecting member remote from the pivotal means, said stop member and manually operable latch to allow said extension arm to be extended from the locked to the unlocked position.

4. The combination with a reel having a winding shaft extending out of one side thereof of a handle for said reel including an arcuate connecting member having a medially-spaced opening therethrough adapted to fixedly connect said member to the winding shaft, an extension arm having a gripping member at one end, spring tensioned pivotal means connecting the other end of said extension arm to one end of said connecting member, locking means formed on said extension arm for holding said extension arm in a locked position including a manually openable latch, the end of said connecting member remote from said pivotal means so shaped that the manually openable latch will move to a non-engaging position when the extension arm is jack-knifed towards the connecting member for locking engagement.

5. The combination with a reel having a winding shaft extending out of one side thereof of a handle including, an arcuate connecting member having a medially-spaced opening therethrough to fixedly connect said member to the winding shaft for rotation thereof, an extension arm having a gripping knob at one end thereof, spring tensioned pivotal means pivotally connecting the other end of said extension arm to one end of said arcuate connecting member, locking means including a manually openable latch to engage at the gripping end of said extension arm for normally holding said extension arm in the locked position on said connecting member, said extension arm adapted to be moved to an unlocked position by manual release of said latch, and a stop means to limit the extension movement of said extension arm to the unlocked position.

6. The combination with a reel having a winding shaft extending out of one side thereof of a handle including, an arcuate connecting member having a medially-spaced opening therethrough to fixedly connect said member to the winding shaft for rotation thereof, an extension arm having a gripping knob at one end thereof, adjustable spring-tensioned pivotal means pivotally connecting the other end of said extension arm to one end of said arcuate connecting member, locking means including a manually openable latch to engage at the gripping end of said extension arm for normally holding said extension arm in the locked position on said connecting member, said extension arm adapted to be moved to an unlocked position by manual release of said latch, and lateral stop members on both ends of said extension arm to limit the movement towards and away from said connecting member to the locked and unlocked positions.

7. In an extensible handle for reels, a connecting member, an extension arm having a gripping member at one end thereof, adjustable spring-tensioned pivot means pivotally connecting the other end of said extension arm to one end of said connecting member, and locking means formed on the end of said extension arm for holding said extension arm in locked engagement with said connecting member, said locking means manually openable to allow said extension arm to be extended from the locked to an unlocked position.

8. In an extensible handle for reels, a connecting member, an extension arm having a gripping member at one end thereof, adjustable spring-tensioned pivot means pivotally connecting the other end of said extension arm to one end of said connecting member, locking means formed on the end of said extension arm for holding said extension arm in locked engagement with said connecting member, said locking means manually openable to allow said extension arm to be extended from the locked to an unlocked position, and stop means formed on said extension arm to limit the folding and extending movement thereof from the locked to the unlocked position.

9. In an extensible handle for reels, a connecting member, an extension arm having a gripping member at one end thereof, adjustable spring-tensioned pivot means pivotally connecting the other end of said extension arm to one end of said connecting member, locking means formed on the end of said extension arm for holding said extension arm in locked engagement with said connecting member, said locking means manually openable to allow said extension arm to be extended from the locked to an unlocked position, and at least one stop means to limit the movement of the extension arm to the unlocked position.

10. In a handle as claimed in claim 8 wherein stop means comprises at least one lateral projection on the extension arm to engage the lower portion of the connecting member when the extension arm is moved to an unlocked position.

11. In an extensible handle for reels, a connecting member, an extension arm having a gripping member at one end thereof, adjustable spring-tensioned pivot means pivotally connecting the other end of said extension arm to one end of said connecting member, and locking means formed on the end of said extension arm for holding said extension arm in locked engagement with said connecting member, said locking means manually openable to allow said extension arm to be extended from the locked to an unlocked position, a camming surface formed on the end of said connecting member to contact said locking means on movement of said extension arm to the locking position, and a spring element normally urging said locking means to a locked position for automatic locking of said extension arm to the connecting member when the extension arm is moved to the locked position.

12. In an extensible handle for reels, a connecting member, an extension arm having a gripping member at one end thereof, adjustable spring-tensioned pivot means pivotally connecting the other end of said extension arm to one end of said connecting member, and locking means formed on the end of said extension arm for holding said extension arm in locked engagement with said connecting member including, a manually operable latch to allow said extension arm to be extended from a locked to an unlocked position, and a stop means to limit the movement of the extension arm to the locked position, a camming surface formed on the end of said connecting member to disengage said locking means on movement of said extension arm to the locking position, and a spring element to automatically actuate said locking means after engagement by said camming surface when said extension arm is moved to the locked position.

References Cited in the file of this patent
UNITED STATES PATENTS

| | | |
|---|---|---|
| 698,720 | Lowe | Apr. 20, 1902 |
| 713,371 | Adams | Nov. 11, 1902 |
| 1,045,041 | Kolb | Nov. 19, 1912 |
| 1,181,395 | Lane | May 2, 1916 |
| 1,624,114 | Norriel | Apr. 12, 1927 |
| 2,107,875 | Pitney | Feb. 8, 1938 |
| 2,112,804 | Bahr | Mar. 29, 1938 |
| 2,447,079 | McKinnie | Aug. 17, 1948 |
| 2,550,163 | Phenning | Apr. 24, 1951 |
| 2,709,504 | Mamo | May 31, 1955 |